United States Patent [19]
Huber

[11] Patent Number: 5,415,453
[45] Date of Patent: May 16, 1995

[54] BODY FOR PASSENGER CARS

[75] Inventor: Guntram Huber, Aidlingen, Germany

[73] Assignee: Mercedes-Benz AG, Stuttgart, Germany

[21] Appl. No.: 223,494

[22] Filed: Apr. 5, 1994

[30] Foreign Application Priority Data

Apr. 6, 1993 [DE] Germany .................. 43 11 342.7

[51] Int. Cl.$^6$ .............. B60J 1/20; B60S 1/04
[52] U.S. Cl. .............. 296/180.1; 296/146.15; 15/250.16
[58] Field of Search ........... 296/146.15, 180.1, 180.2; 15/250.16, 250.17, 250.19, 250.31, 250.35

[56] References Cited

U.S. PATENT DOCUMENTS 2,895,157 7/1959 Kocourek .
3,525,114 8/1970 Smith ........................ 15/250.16
4,756,568 7/1988 Yamamoto et al. .
5,101,531 4/1992 Edwards et al. ................ 15/250.19

FOREIGN PATENT DOCUMENTS 3206173 8/1983 Germany .

Primary Examiner—Dean Kramer
Attorney, Agent, or Firm—Evenson, McKeown, Edwards & Lenahan

[57] ABSTRACT

A body for passenger cars has a rear window, a rear spoiler and a rear-window wiper. The rear-window wiper, in its parking position, penetrates into a gap formed between the rear spoiler and rear window. To avoid impairing the aerodynamic properties of the rear spoiler as a result of the integrated arrangement of the rear-window wiper, and to achieve a visually attractive appearance of the rear spoiler, a cover strip is fastened to the wiper arm of the rear-window wiper which, in the parking position of the rear-window wiper, covers the gap between the rear spoiler and rear window with essentially a form fit.

8 Claims, 1 Drawing Sheet

BODY FOR PASSENGER CARS

BACKGROUND AND SUMMARY OF THE INVENTION

The invention relates to a body for passenger cars, especially for sports coupes and, more particularly, to a body for passenger cars with a rear window, a rear spoiler and a rear-window wiper. The rear-window wiper, in its parking position, penetrates with its wiper arm and wiper blade in a gap present between the rear spoiler and rear window.

A motor-vehicle body having a rear spoiler and a rear-window wiper is known from German Patent document DE 3,206,173 A1. In the German Patent document, the rear spoiler is fastened to the body underneath the rear window. The rear spoiler projects with an unsupported portion into the rear window via the bottom edge of the window. At the same time, the rear spoiler leaves a clearance relative to the rear window. The drive shaft of the rear-window wiper is arranged in the gap formed between the unsupported portion of the rear-spoiler body and the rear window. The drive shaft is fixed either to the rear window or to the rear-spoiler body. The parking position of the rear-window wiper is selected so that the rear-window wiper pivots with its wiping arm and its wiper blade held thereon into the gap between the rear window and rear spoiler and is therefore masked visually by the unsupported portion of the rear-spoiler body.

The relatively wide gap between the rear window and the projecting part of the spoiler, which must be larger than the sum of the height of the wiping arm and wiper blade, gives rise to undesirable aerodynamic effects especially at high speed. These include dynamic pressure and the like, which cancel out some of the improvements in the formation of the air flow at the rear of the body that is aimed at with the rear spoiler.

There is therefore needed a design for a vehicle body for passenger cars of the type mentioned above, wherein the aerodynamic effect of the rear spoiler is not adversely affected by the visual integration of the rear-window wiper into the rear spoiler.

In a body for passenger cars with a rear window, rear spoiler and a rear-window wiper, this need is met according to the present invention by a cover strip which is fastened in the wiper arm of the rear-window wiper. The cover strip is designed in such a way that, in the parking position of the rear-window wiper, it closes the gap between the rear spoiler and rear window with an essentially form fit.

The free space between the rear spoiler and rear window, necessary for the rear-window wiper, is masked completely in the parking position of the rear-window wiper by the cover strip according to the present invention. The cover strip is located on the wiper arm of the rear-window wiper. The rear spoiler has a closed shape with a smooth-faced surface which is designed entirely according to aerodynamic factors. Thus, the improved aerodynamics of the body achieved by using the rear spoiler are preserved at medium and high vehicle speeds. As before, the rear-window wiper is concealed in its parking position, 80 that a visually attractive appearance of the rear spoiler is also obtained. The impaired aerodynamics of the rear spoiler in the wiping mode of the rear-window wiper are not a serious disadvantage, since the driving speed in the case of rain must, in any event, be markedly reduced. Therefore, this negative effect is scarcely significant.

According to a preferred embodiment of the invention, the cover strip is designed as a wind-guiding device which, in the wiping mode, increases the pressing force of the wiper blade on the rear window. The bearing of the wiper blade on the rear window is thereby improved at the same time, without additional aids being necessary.

According to a further embodiment of the invention, the gap between the rear spoiler and rear window for receiving the rear-window wiper is formed by a recess. The recess is located in the rear-spoiler body and is open only towards the rear window. At the same time, the recess is limited by a first flank extending parallel to the rear window and at an acute angle to the rear-spoiler surface, and by a second flank in the rear-spoiler body. The second flank extends at right angles to the first flank and is oriented at right angles to the rear window. The recess, extending transversely relative to the longitudinal axis of the vehicle, is closed off on the end face by lateral flanks located in the rear-spoiler body and oriented parallel to the longitudinal axis of the vehicle. The cover strip on the wiper arm of the rear-window wiper is designed in such a way that it uniformly continues the rear-spoiler surface towards the rear window, that is to say it terminates flush with the latter.

According to alternative embodiments of the invention, the rear-window wiper can be fastened to the rear spoiler or to the rear window, as is also known from German Patent document DE 3,206,173 A1. At the same time, the drive shaft can be arranged in the vehicle middle or offset laterally relative to the latter. In the first case, the recess is arranged asymmetrically to the middle of the rear-spoiler and extends approximately from the rear-spoiler middle to near one side of the rear spoiler. In the second case, the recess is arranged symmetrically in the rear spoiler. In both cases, the drive shaft of the rear-window wiper is located on or near one lateral flank of the recess.

Other objects, advantages and novel features of the present invention will become apparent from the following detailed description of the invention when considered in conjunction with the accompanying drawings.

DETAILED DESCRIPTION OF THE DRAWINGS

Figure 1:
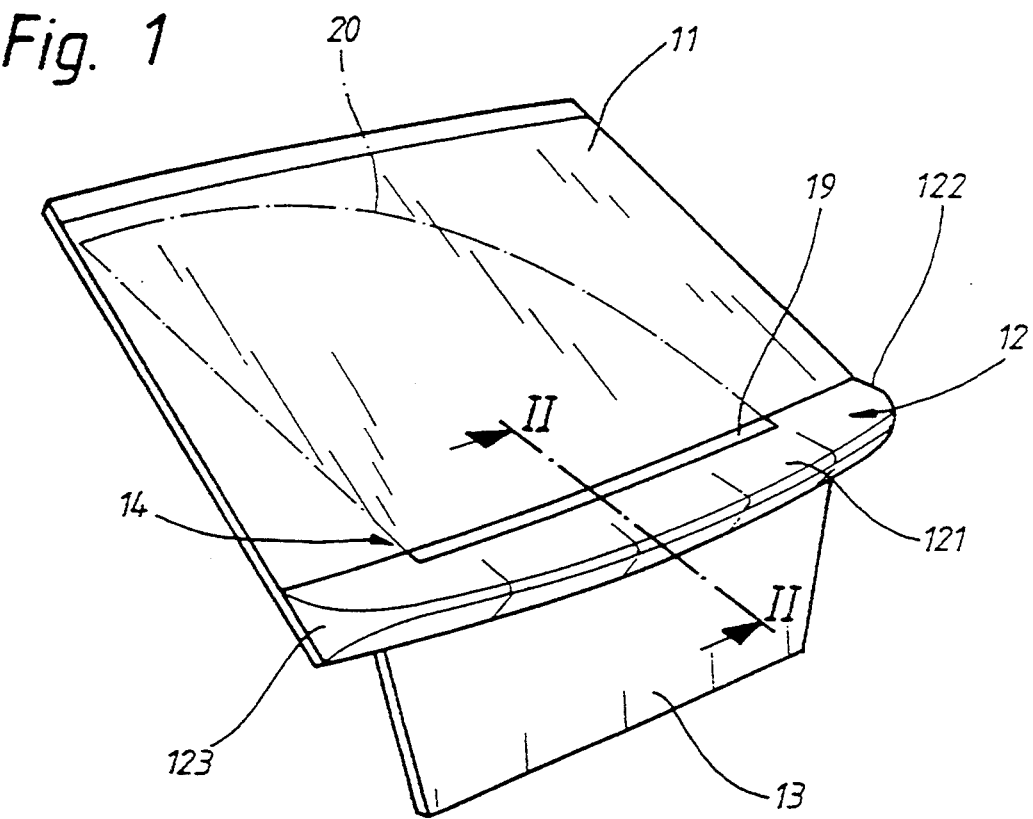
FIG. 1 illustrates a schematic partial cutout of a perspective representation of the rear view of a body of a sports coupe.
Figure 2:
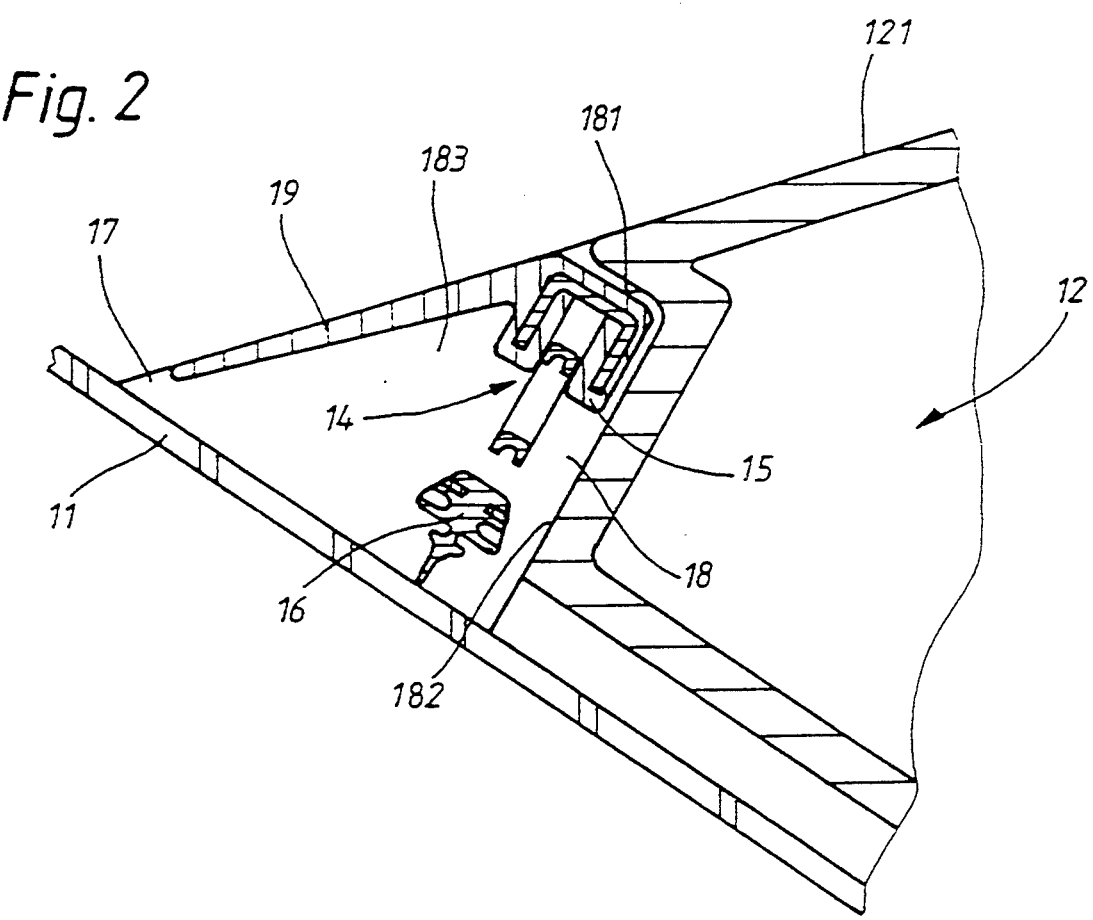
FIG. 2 illustrates a schematic sectional view taken along the line II—II in FIG. 1.

FIG. 1 shows a partial perspective representation of a rear view of the body of a sports coupe according to a preferred embodiment of a passenger car. In FIG. 1, 11 denotes the back light or rear window, 12 denotes a rear spoiler arranged on the bottom edge of the rear window 11, and on part 13 of the body, specifically the rear flap. Because the rear window 11 is very low-slung, the rear window 11 is equipped with a rear-window wiper 14. As shown in FIG. 2, the rear-window wiper 14 consists, in a way known per se, of a wiper arm 15 and of a wiper blade 16 fastened thereto. The rear-window wiper 14 is integrated into the rear spoiler 12 in such a way that, in its parking position, in which the wiper arm 15 and wiper blade 16 lie transversely on the bottom edge of the rear window 11, that is to say transversely to the longitudinal axis of the vehicle, the rear-window wiper 14 penetrates into a gap 17 between the rear-spoiler 12 and rear window 11 and is therefore masked visually by the rear spoiler 12.

For this purpose, the rear spoiler 12 has, in its rear-spoiler body, a recess 18 which is open only towards the rear window 11. The recess 18, as shown in cross-section in FIG. 2, is limited by a first flank 181 extending parallel to the rear window 11 and at an acute angle to the rear-spoiler surface 121, and by a second flank 182 of the rear-spoiler body. The second flank 182 extends at a right angle to the flank 181 and is oriented at a right angle to the rear window 11. The recess 18, extending transversely relative to the longitudinal axis of the vehicle, is closed off in the end face by lateral flanks of the rear-spoiler body which extend parallel to the longitudinal axis of the vehicle and of which only the lateral flank 183 can be seen in FIG. 2.

In order to maintain the aerodynamic effect of the rear spoiler 12 and to achieve a visually attractive appearance of the rear spoiler 12, there is fastened to the wiper arm 15 of the rear-window wiper 14 a cover strip 19 which, in the parking position of the rear-window wiper 14, continues the rear-spoiler surface 121 uniformly towards the rear window 11 and therefore closes the gap 17 between the rear spoiler 12 and rear window 11 essentially with a form fit, as shown in FIGS. 1 and 2. In addition, the cover strip 19 is designed as a wind-guiding device which, when the rear-window wiper 14 is in wiping mode, increases the pressing force of the wiper blade 16 on the rear window 11 as a result of the relative wind.

As is evident from FIG. 1, the recess 18 in the rear-spoiler body is designed symmetrically with respect to the middle of the rear-spoiler 12 and therefore symmetrically to the longitudinal axis of the vehicle. It terminates at a distance in front of the rear-spoiler sides 122 and 123 extending approximately parallel to the longitudinal axis of the vehicle. In FIG. 1, dot-and-dash lines also mark the pivoting arc 20 which the wiper arm 15 and wiper blade 16 execute when the rear-window wiper 14 is in the wiping mode. As is evident from this, the drive shaft, not shown here, of the wiper arm 15 is arranged close against the side face located opposite the side face 183 and limiting the recess 18 on its end face. Alternatively to this, however, the drive shaft of the wiper arm 15 can be arranged in the middle of the rear spoiler 12, that is to say in the longitudinal axis of the vehicle. In this case, the recess 18 in the rear-spoiler body is arranged asymmetrically to the middle of the rear-spoiler and extends from the rear-spoiler middle to near the rear-spoiler side face 122 or 123, depending on the side towards which the parking position of the rear-window wiper 14 is set. The drive shaft for the wiper arm 15 of the rear-window wiper 14 can be fastened either to the rear window 11 or to the rear-spoiler body. Constructive designs of the fastening and mounting of the drive shaft for the wiper arm 15 are indicated and described in German Patent document DE 3,206,173 A1 (see FIGS. 5 and 6).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A body for passenger cars having a rear window, a rear spoiler and a rear-window wiper having a wiper arm and blade, comprising:
    a gap formed between the rear spoiler and rear window, said rear-window wiper, including its wiper arm and blade, being arranged in said gap in a parking position;
    a cover strip extended along said wiper arm of the rear window wiper and directly fastened to said wiper arm to move therewith;
    wherein said cover strip closes said gap between the rear spoiler and rear window with a substantially form fit in the parking position.

2. A body according to claim 1, wherein the cover strip is designed as a wind-guiding device which, in a wiping mode, increases a pressing force of the wiper blade on the rear window.

3. A body according to claim 1, wherein in the parking position, the rear-window wiper is received by a recess which is formed in the rear spoiler and which is open towards the rear window, and wherein the recess is limited by a first flank extending parallel to the rear window and at an acute angle to a surface of the rear-spoiler surface, and by a second flank of the rear-spoiler body, the second flank extending at right angles to the first flank and being oriented at right angles to the rear window, said recess being closed off at an end face by lateral flanks in the rear-spoiler body which extend parallel to the longitudinal axis of the vehicle.

4. A body according to claim 3, wherein the cover strip is shaped in such a way that, in the parking position of the rear-window wiper, it uniformly continues the rear-spoiler surface towards the rear window.

5. A body according to claim 3, wherein a drive shaft of the wiper arm of the rear-window wiper is arranged on or near a lateral flank of the recess.

6. A body according to claim 5, wherein the recess is designed symmetrically to the middle of the rear-spoiler and terminates at a distance in front of the sides of the rear-spoiler.

7. A body according to claim 5, wherein the recess is arranged asymmetrically to the middle of the rear-spoiler and extends approximately from the middle to near one of the rear-spoiler sides.

8. A body according to claim 5, wherein the recess is arranged asymmetrically to the middle of the rear-spoiler and extends approximately from the middle to near one of the rear-spoiler sides.

* * * * *